(12) United States Patent
Michalski et al.

(10) Patent No.: US 6,470,058 B1
(45) Date of Patent: Oct. 22, 2002

(54) SYSTEM FOR AND METHOD OF JOINTLY OPTIMIZING THE TRANSMIT ANTENNA PATTERNS OF TWO GEOSTATIONARY SATELLITES IN A SATELLITE BROADCASTING SYSTEM

(75) Inventors: Richard A. Michalski, Frederick, MD (US); Charles Kittiver, Vienna, VA (US)

(73) Assignee: XM Satellite Radio, Washington, DC (US)

( * ) Notice: Subject to any disclaimer, the term of this patent is extended or adjusted under 35 U.S.C. 154(b) by 0 days.

(21) Appl. No.: 09/877,102

(22) Filed: Jun. 11, 2001

(51) Int. Cl.[7] .............................. H04B 7/06; H04B 7/185
(52) U.S. Cl. ........................................ 375/299; 342/352
(58) Field of Search ................................ 342/352, 354; 375/299, 349, 347; 455/101, 132–141, 272–279.1

(56) References Cited

U.S. PATENT DOCUMENTS 5,625,868 A * 4/1997 Jan et al. ..................... 342/352
6,104,911 A * 8/2000 Diekelman ................. 342/352
6,138,012 A * 10/2000 Krutz et al. ................. 455/272
6,154,452 A   11/2000 Marko et al.
6,229,824 B1  5/2001 Marko

* cited by examiner

*Primary Examiner*—Thomas H. Tarcza
*Assistant Examiner*—Fred H Mull
(74) *Attorney, Agent, or Firm*—Shaw Pittman LLP (57) ABSTRACT

A system for and method of providing optimizing the antenna patterns on a first satellite and a second satellite that operate in conjunction to deliver content to a single radio receiver. The process begins by first selecting an objective predictive model for predicting link margin at a first location and a link margin at a second location. The model is used further to determine an initial required transmit power flux densities to achieve the first and second link margins. Then the power flux density is adjusted for the first location by decreasing the power flux density for the first satellite and simultaneously increasing the power flux density for the second satellite. The predicted joint availability for the first location is then predicted. In the event the required power flux density cannot be achieved to achieve a desired joint availability across an entire geographical region, the power flux density for both the first and second satellites for the first location are decreased.

20 Claims, 13 Drawing Sheets

| | Station Number | Desired Availability (115) | Required EIRP in dBW (115) | Required EIRP in dBW (115) | Required EIRP in dBW (85) | Desired Availability (for pair) | Comment |
|---|---|---|---|---|---|---|---|
| Initial Specificaton | 1 | 90% | 62.3 | 90% | 67.7 | 99.0% | Independent Optimization requires unrealizable EIRP for this location for one satellite (85). In addition, producing this EIRP at such a low elevation produces unacceptable spill-over outside of the coverage area. |
| Adjusted Specification | 1 | 95% | 66.5 | 80% | 63.7 | 99.0% | Second attempt requires EIRP which is too high for other satellite. |
| Third attempt at reasonable specification | 1 | 94% | 65.5 | 83% | 65.0 | 99.0% | Third attempt has achievable EIRP for both satellites and meets joint availability requirement. If it didn't the joint availability spec would need to be relaxed. |

Assumes EIRP limit of 66dBW close to edge of coverage for each satellite

FIG. 13

SYSTEM FOR AND METHOD OF JOINTLY OPTIMIZING THE TRANSMIT ANTENNA PATTERNS OF TWO GEOSTATIONARY SATELLITES IN A SATELLITE BROADCASTING SYSTEM

BACKGROUND

1. Field of the Invention

The present invention is directed to satellite transmit antenna analysis, design and optimization. More particularly, the present invention is directed to a system for and method of jointly optimizing two or more antenna patterns projected from respective satellites that use spatial diversity transmission techniques to minimize outages at ground-based receivers.

2. Background of the Invention

The Federal Communications Commission recently approved the use of selected radio spectrum for satellite radio broadcasting. Satellite radio broadcasting delivers up to 100 channels of audio to ground-based mobile receivers (radios) that may be installed in vehicles such as cars, boats, etc., and to traditional portable or non-portable radio receivers such as those embodied in stereo receivers or clock-radios.

One implementation for a broadcast segment of a satellite radio system comprises two geostationary satellites "parked" at 85° and 115° West. In these orbits, virtually every location in the continental United States (CONUS) has a direct view of both satellites. In a preferred implementation of the broadcast segment, described in detail in U.S. Ser. No. 09/318,938, filed May 26, 1999, now U.S. Pat. No. 6,154,452 entitled "METHOD AND APPARATUS FOR CONTINUOUS CROSS-CHANNEL INTERLEAVING," and U.S. Ser. No. 09/433,861, filed Nov. 4, 1999, entitled "METHOD AND APPARATUS FOR CONCATENATED CONVOLUTIONAL ENCODING AND INTERLEAVING," now U.S. Pat. No. 6,229,824 (both of which are incorporated herein in their entireties by reference), two satellites employ diversity broadcasting techniques, which rely on interleaving signals on each satellite, as well as between satellites, so that in the event one satellite becomes blocked momentarily due, e.g., to terrain or buildings in an urban setting, the radio receiver can still decode the intended transmission and make the signal available for listening via speakers or headphones. Stated differently, the two cited references describe methods and apparatuses for implementing a satellite broadcasting system that uses spatial diversity techniques to minimize outages to radio receivers, and most specifically, to mobile radio receivers.

By having two satellites transmit different, yet related, signals that are both received and decoded (and thereafter combined in accordance with the aforementioned references) by a single radio receiver, the chances that the intended transmission is actually received and properly played for a listener are greatly increased. This is especially important for mobile radio receivers that may encounter frequent, yet relatively brief blockages. However, in order to fully exploit the advantages of employing two satellites that employ spatial diversity techniques to enhance the chances of receiving the intended transmissions, it is important to provide uniform high availability for each of the satellites.

SUMMARY OF THE INVENTION

It is therefore an object of the present invention to provide a system for and a method of optimizing the antenna patterns of at least two satellites to achieve a maximum combined availability across a predefined geographic region.

It is another object of the present invention to provide a system for and a method of calculating the most desirable antenna patterns for at least two satellites in a satellite broadcasting system that employs spatial diversity broadcasting techniques.

It is another object of the present invention to provide a system for and a method of determining the desired antenna patterns for at least two antennas, each on a separate geostationary satellite.

To achieve the foregoing and other objects, the present invention provides a system for and a method of jointly optimizing the transmit antenna patterns of two geostationary satellites in a satellite broadcasting system that uses spatial diversity techniques to minimize outages, especially to mobile receivers. While various techniques exist to combine signals from two or more satellites to minimize the periods of time when a signal is unavailable, none of these prior art techniques addresses a situation in which the antenna patterns of two geostationary satellites that employ spatial diversity broadcasting techniques might be adjusted to improve overall reception performance.

More specifically, when spatial diversity is employed, two geostationary satellites with a common coverage area provide redundant signal paths so that even though one path might be degraded, a high probability exists that the other path is less degraded. The present inventors recognized that in order to optimally design such spatial diversity systems it is desirable to manipulate the antenna patterns of the two satellites to provide uniform high availability without wasting power where it is not needed and without blindly using modeling techniques that result in physically impossible antenna configurations.

Thus, a process according to the present invention preferably involves initially determining a transmit power flux density (PFD) requirement for each individual satellite at a number of locations within a desired coverage area (e.g., CONUS) using an objective analytical model to determine the necessary margin to achieve a given availability. Then, in regions where one satellite's antenna cannot achieve the desired power level just-calculated, the process involves reducing the requirement for that satellite and simultaneously increasing the PFD requirement for the other satellite in the same location, so that the combined availability for both satellites meets the desired level of availability.

Where it is impossible to meet the desired joint availability at all points or locations within the desired coverage area, the present invention calls for relaxing the PFD requirement for both satellites in areas with low populations and/or low intrinsic fading probability and re-allocating the "found" power to other terrestrial locations. The foregoing steps are repeated and the predicted joint availability is re-calculated until an acceptable antenna pattern solution is found.

The details and advantages of the present invention will become apparent upon a reading of the following detailed description in conjunction with the accompanying drawings.

DETAILED DESCRIPTION OF THE INVENTION

In accordance with the present invention, the respective antenna patterns of two (or more) geostationary satellites are shaped, tuned or adjusted to provide uniform high availability to terrestrial radio receivers, without wasting power where it is not needed. The present invention is particularly useful in a satellite broadcasting system in which spatial diversity techniques are employed to increase the likelihood of clear reception from the satellite broadcasts.

Figure 1:
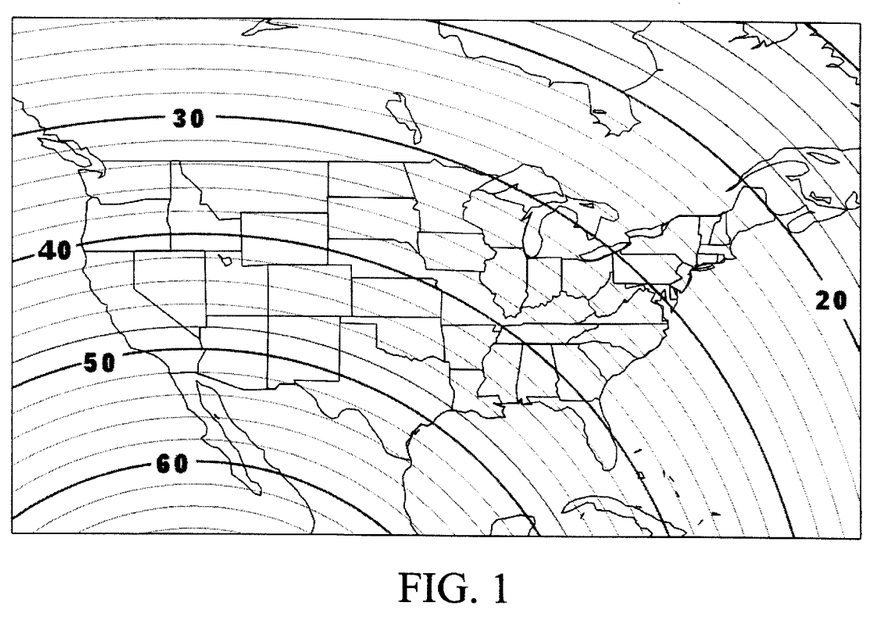
FIGS. 1 and 2 show, respectively, the elevation angles for a satellite located at 115° West and 85° West.
Figure 2:
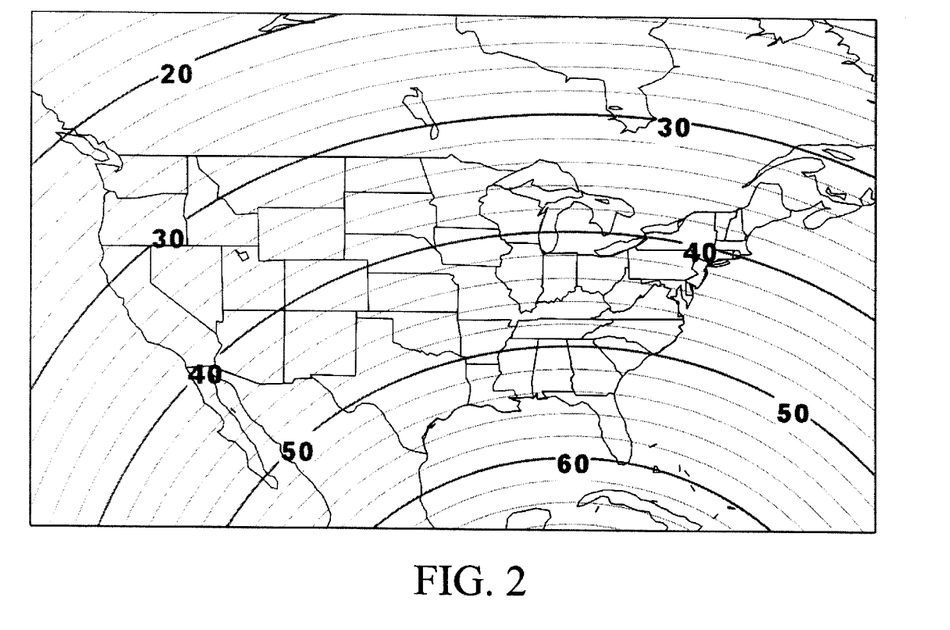

FIGS. 1 and 2 show, respectively, the elevation angles for satellites located at 115° West and 85° West. From these figures, it is apparent that radios in different regions of the United States will have differing line of sight (LOS) elevation angles to each of the two satellites. As a result, and in view of fading due to foliage, for example, different standing link margins are required to maintain a predetermined level of availability.

Figure 3:
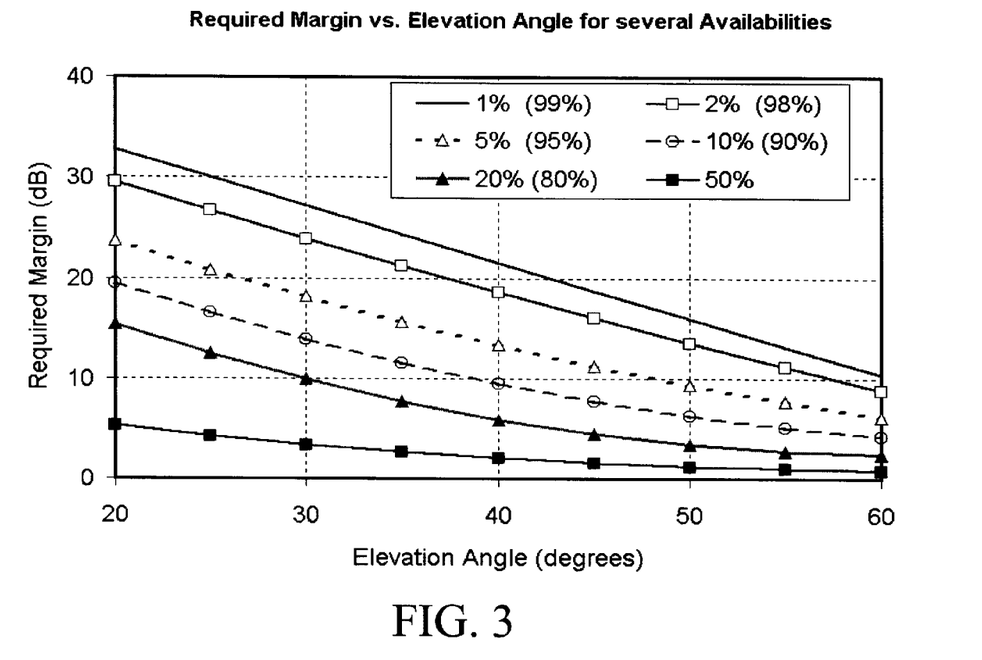
FIG. 3 is a graph depicting the extended empirical roadside shadowing (EERS) model relationship between elevation angle and required margin for several levels of availability.

FIG. 3 is a graph depicting the extended empirical roadside shadowing (EERS) model relationship between elevation angle and required margin. The EERS model provides estimates of cumulative fade distributions due to roadside trees (i.e., foliage) within the following parameters: UHF (870 MHz) through S-Band (3 GHz), elevation angles to the satellite from 20° to 60° and percentages of outage from 1% to 20%. This well-known model is recommended by the International Telecommunications Union Radio Communication Section (ITU-R) (1994). Based on this model, it is possible to calculate a required link margin with respect to an elevation angle for desired levels of availability. These relationships are shown in the graph of FIG. 3. Thus, for example, in order to attain a 99% availability, it is necessary to have a link margin of approximately 33 dB where there is a 20° elevation angle to the satellite.

Figure 4:
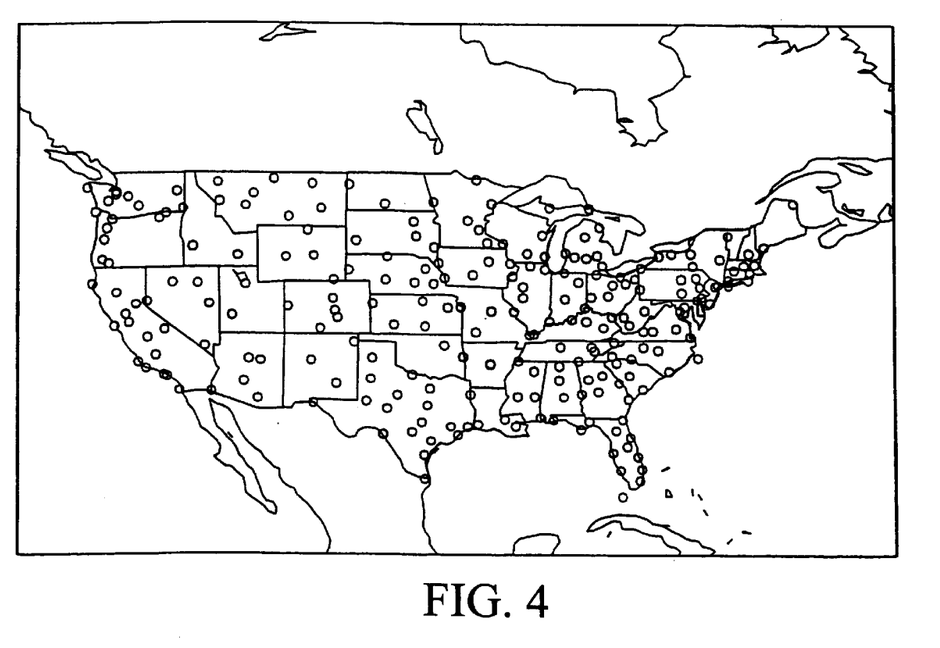
FIG. 4 is a schematic diagram of sample locations in the continental United States.

In a satellite radio broadcast system, which can potentially transmit to the entire CONUS, it is typically desirable to ensure that the relatively larger listening markets, i.e., populous cities and other more densely populated regions, have the highest possible reception availability, even at the expense of less populated regions. FIG. 4 is a schematic diagram of sample locations in the United States at which the EERS model was applied. Using this model, it is possible to determine the required transmit power flux density (PFD) to achieve the desired link margin and availability at each of the pre-selected regions, locations or points. In accordance with the present invention, in regions where one satellite's antenna cannot achieve the desired power level in a particular location, that satellite's power requirement is reduced and the other satellite's transmit PFD is increased simultaneously for that location. As a result, the combined availability for both (or more) satellites meets a desired level of availability.

Where it is not possible to meet desired joint availability at all points or locations, the transmit PFD can be reduced for both satellites in areas with low population and/or low intrinsic fading probability. The resulting power that is saved is then reallocated to the locations requiring better margin/availability. The foregoing steps are preferably repeated until an acceptable antenna pattern solution (for each satellite) is found. Of course, other criterion for choosing which locations might have to bear reduced availability are also within the scope of the present invention.

In an actual implementation of the process described above, the shapes of the antennas on two satellite radio satellites were optimized. It is noted that once a desired antenna pattern is calculated, there are well-known methods to practically implement the optimized design on the actual satellite antennas. These include physically shaping the antennas, orienting them, as well as programming phased array antennas to achieve the desired effective pattern.

Figure 5:
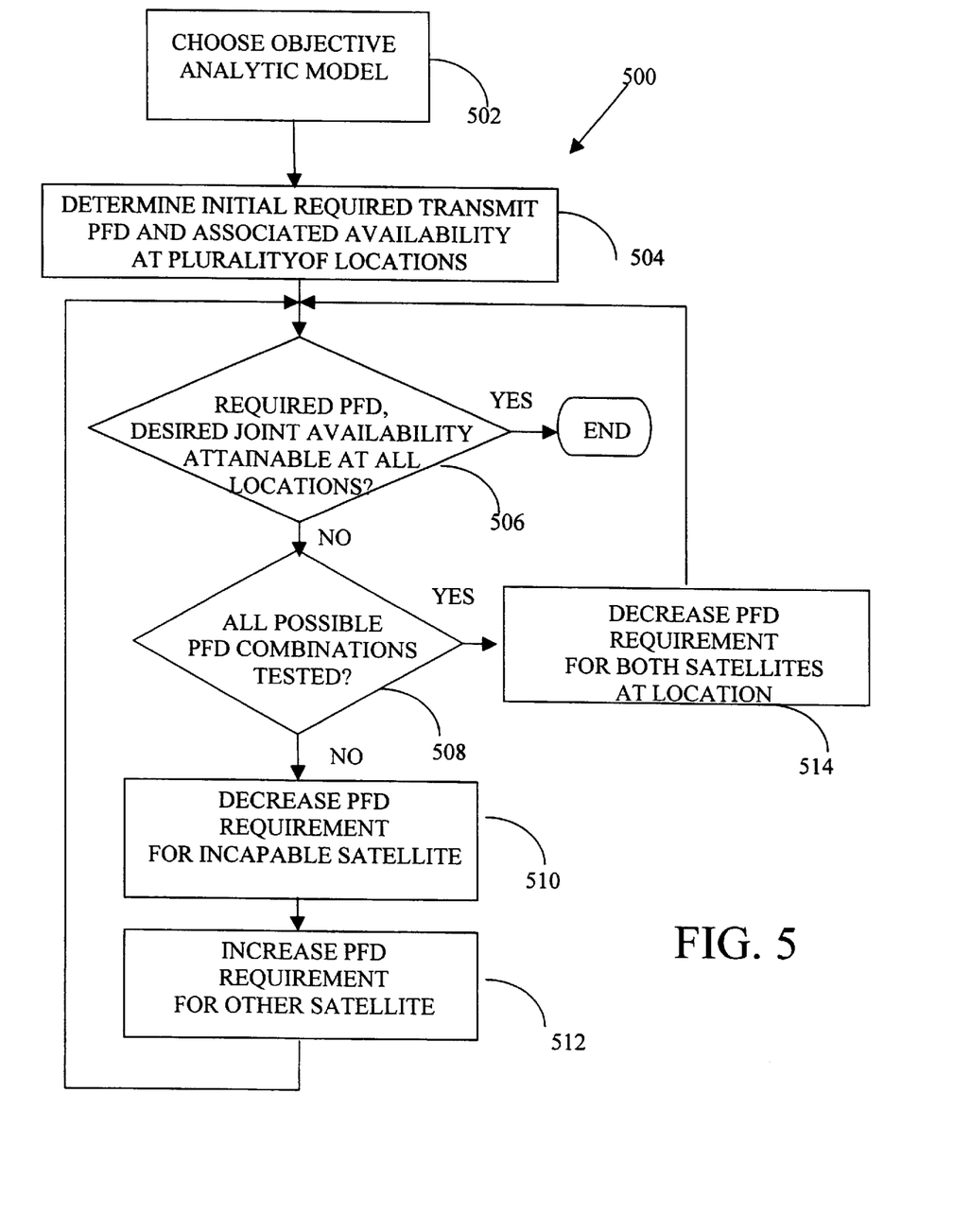
FIG. 5 is a flow chart of an exemplary implementation of the method of the present invention.

A flow chart of an exemplary process 500 in accordance with the present invention is shown in FIG. 5. At step 502, an objective model that can predict link margins based on elevation angles, power, foliage (fading), etc., is chosen. In the actual implementation, the EERS model was chosen, as it is one of the more well-known predictive modeling standards and is well-accepted by those skilled in the art. Then, at step 504, the initial required transmit PFD of each satellite at a number of locations within the desired coverage area (e.g., those shown in FIG. 3) is determined based on the desired margin to achieve a given availability.

The availability goal for a single satellite is preferably given by $$Av_{SAT1} = 1 - \sqrt{1 - (Av_{BOTH})}.$$

Of course this formula applies only for two satellites where the outages of one are statistically independent of the other. Other formulas to determine the individual satellite availability when a goal for both (or all in the case of more than two satellites) may also be used provided that a mathematical relationship of some kind can be assumed between the individual availability and the joint or combined availability for the group of satellites.

For example, if the availability goal for both satellites is 99%, then the single satellite availability goal $Av_{SAT1}$ would be 90%. If the availability of the two satellites was somehow statistically related rather than being independent, a goal of higher than 90% for each satellite would be required to achieve 99% joint availability.

The Margin (M) required to achieve the desired availability (Av) is determined using the EERS model as a function of elevation angle (θ), using the following formula:

$$M(Av,\theta,fL)) = \alpha(Av) + \beta(Av)\theta + \gamma(Av)\theta^2$$

If all regions have attained sufficient power levels to achieve the desired margin (and thus availability), that is, if at step 506 the PFD and desired joint availability is attainable and/or acceptable at each location, then the process ends and the antennas are deemed to be optimized in accordance with the desired goals, e.g., 99% availability. However, in regions where one satellite's antenna cannot achieve the desired power level, or cannot achieve an acceptable power level, the process continues with step 508 at which it is determined if all possible PFD requirement combinations have been tested or analyzed. If not, the process continues with step 510 where the power requirement for the incapable satellite's antenna is reduced. Immediately thereafter, at step 512, the PFD requirement is increased for the antenna on the other satellite for the same location. The process then returns to step 506 to determine whether the combined availability for both satellites meets the desired availability, e.g. 99%.

As shown in FIG. 5, the process continues until it is no longer feasible to decrease or increase the required PFD on a given satellite and make the opposite adjustment on the other satellite. More specifically, at step 508, it is determined whether there are any remaining combinations of required PFD for a given location to analyze. If all possible combinations, or more precisely, if a substantial or reasonable subset of all possible combinations has been analyzed without realizing a satisfactory antenna pattern solution, then the process continues with step 514 where the PFD requirement is decreased for both satellites at the location being analyzed. Reduction of the PFD requirement for both satellites is preferably reserved for locations that are less populated, have relatively less susceptibility to fading due to foliage and/or are deemed to be commercially less important and thus can be sacrificed in order to provide better availability to other location or regions.

In view of the foregoing, the present invention makes it possible to optimize the satellite antenna patterns for the space-based broadcasting segment of a satellite radio broadcasting system. However, the preferred method of the present invention is applicable to any broadcast satellite system using two geostationary satellites with shapeable antenna patterns. The present invention is particularly useful where it is desired to achieve a high level of satellite availability by combining signals from both satellites to exploit diversity techniques.

Those skilled in the art will readily appreciate that the antenna patterns for the satellites are preferably optimized jointly such that shortfalls in performance of one satellite are compensated with improvements in the other satellite via adjustment of the PFD requirements.

Figure 6:
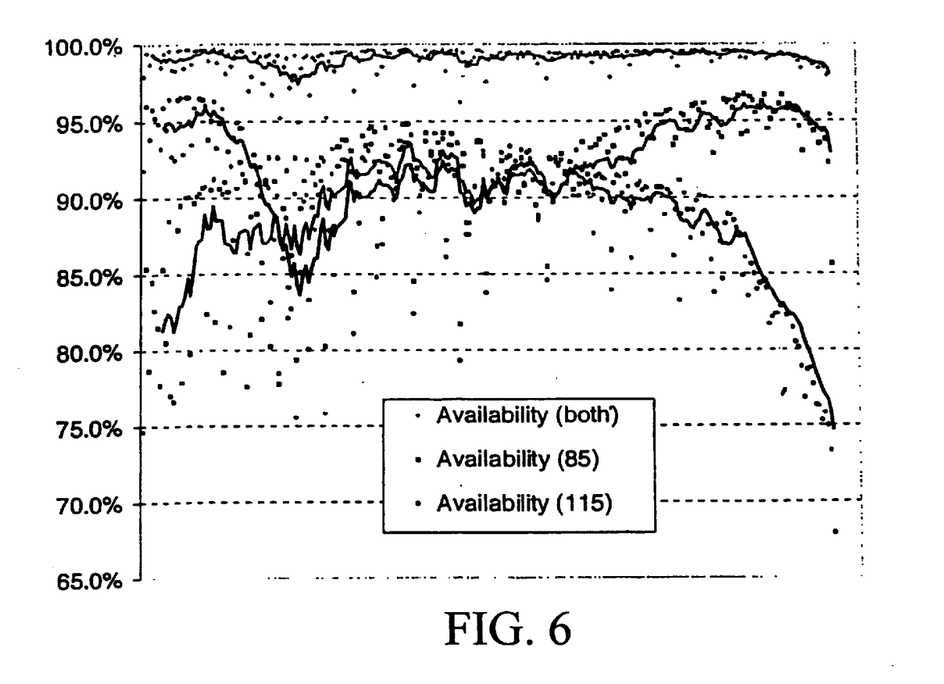
FIG. 6 is a graph illustrating the predicted EERS availability for two satellites in accordance with the present invention.

FIG. 6 is a graph illustrating the predicted EERS availability for two satellites in accordance with the present invention. Uniform high availability can be achieved by matching over-performing regions (e.g., better than 90%) on one satellite with under-performing regions (e.g., below 90%) on the other satellite.

Figure 7:
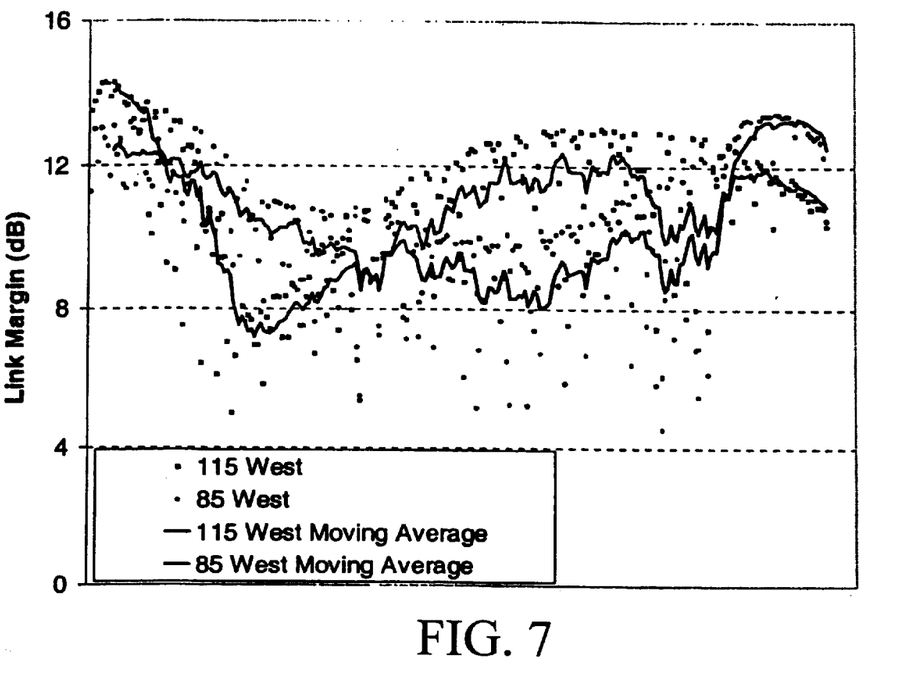
FIG. 7 depicts the achieved link margin for two satellites at various locations across the United States, corresponding to the predicted EERS availability of FIG. 6.

FIG. 7 depicts the achieved link margin for two satellites at various locations across the United States, corresponding to the predicted EERS availability of FIG. 6.

Figure 8:
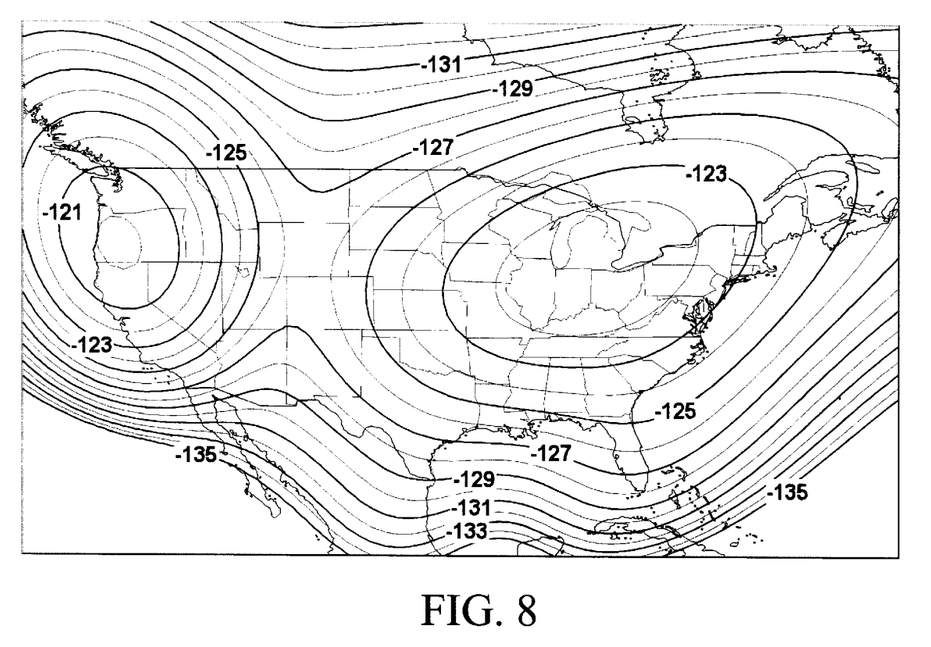
FIGS. 8 and 9 show the respective power flux density of satellites at 115° West and 85° West.
Figure 9:
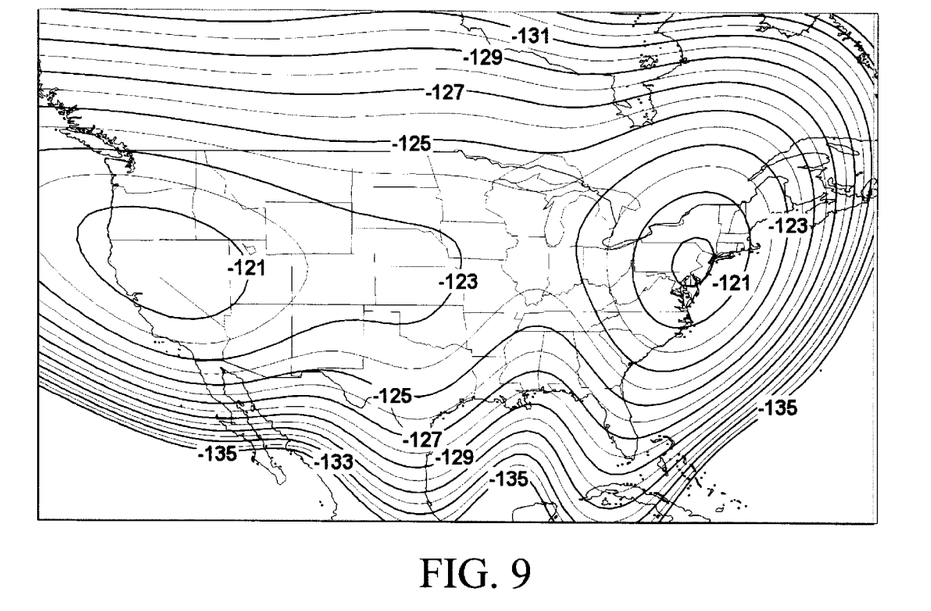
Figure 10:
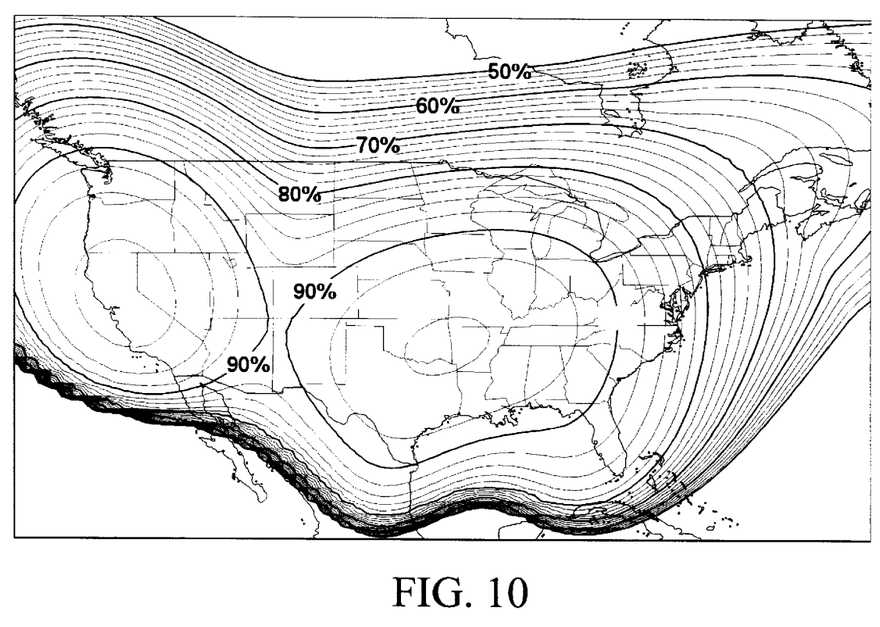
FIGS. 10 and 11 show, respectively, the predicted single satellite EERS availability for satellites at 115° West and 85° West.
Figure 11:
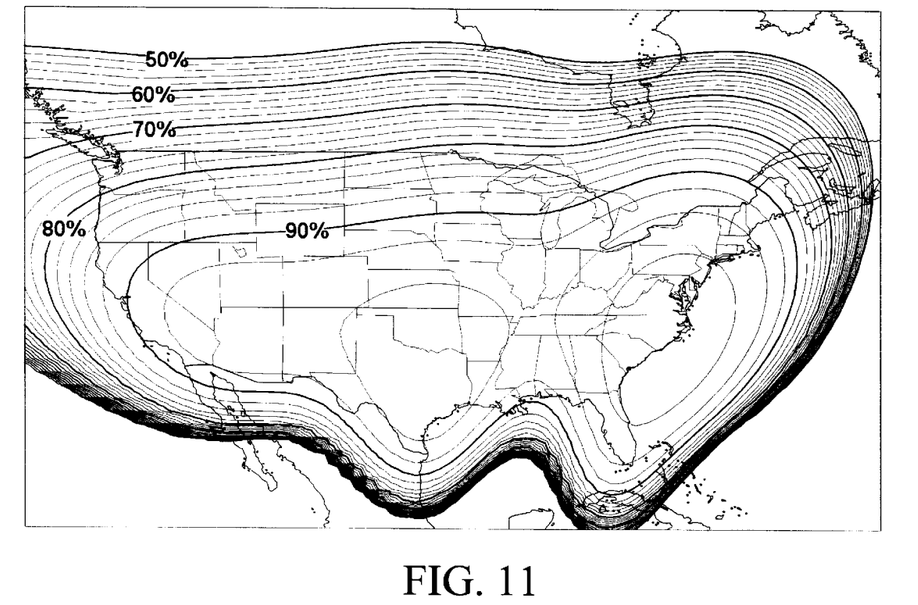
Figure 12:
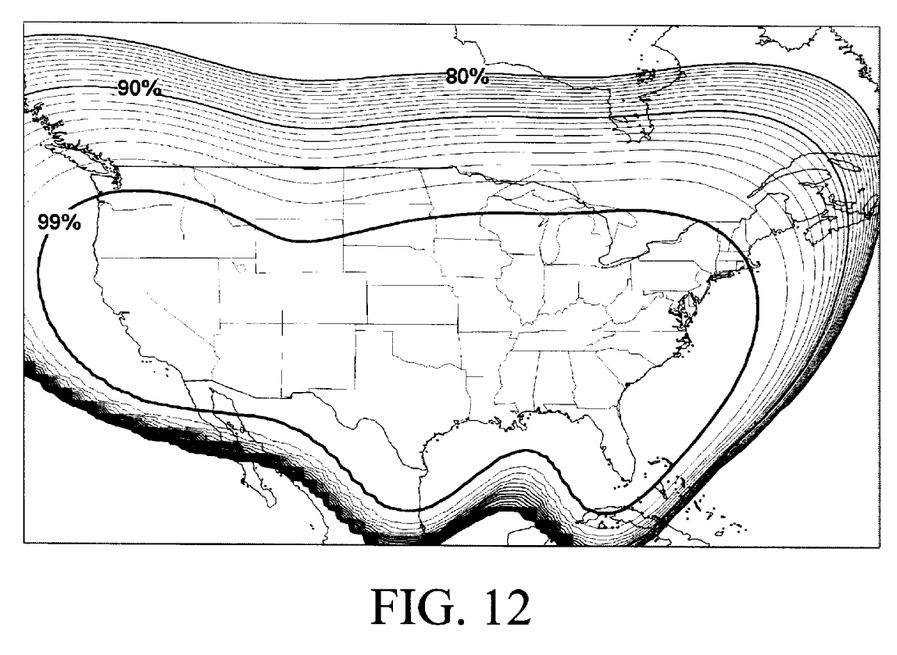
FIG. 12 shows the predicted combined availability for a two-satellite system in accordance with the present invention.

FIGS. 8 and 9 show the respective power flux density of satellites at 115° West and 85° West. FIGS. 10 and 11 show, respectively, the predicted single satellite EERS availability for the two satellites. These figures, in combination with FIG. 12, which shows the predicted combined availability for a two-satellite system, clearly show the benefit of the iterative process of the present invention.

Figure 13:
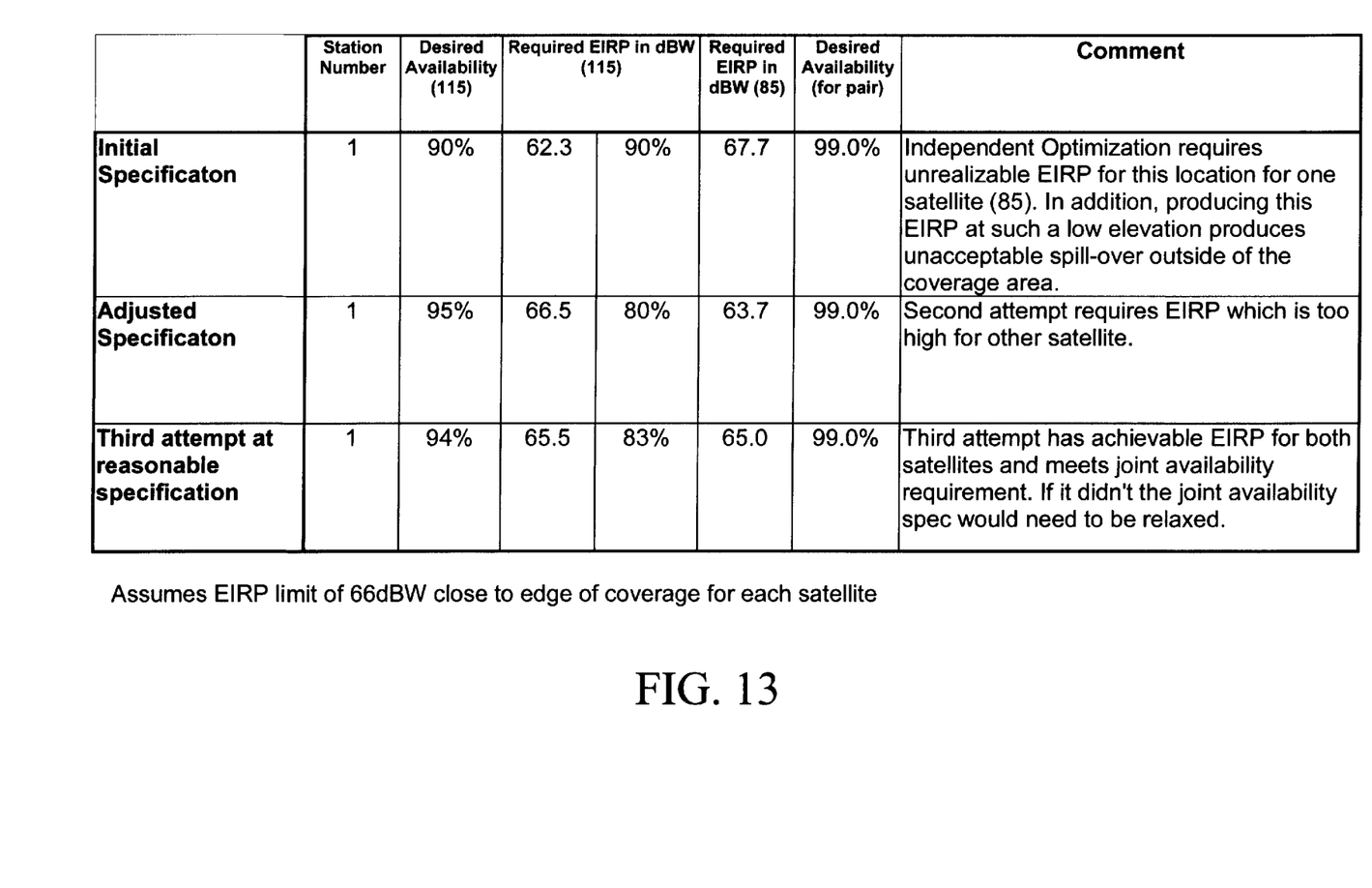
FIG. 13 depicts a simplified example of the process of the present invention for a single location and two satellites.

FIG. 13 depicts an exemplary iterative process for availability optimization in accordance with the present invention. As shown, if 90% availability is desired from both satellites, then, assuming a maximum EIRP limit of 66 dBW, the second satellite's EIRP is unrealizable. If the first satellites desired availability is increased to 95% and the second satellite's desired availability is decreased to 80%, then the first satellite's EIRP is unrealizable. Accordingly, the first satellite's desired availability is decreased slightly to 94% and the second satellite's desired availability is increased to 83%, whereby a realizable solution is achieved.

The present invention is preferably implemented with software that is run on a general purpose computer. Of course, portions, or even all of the functionality described herein could also be implemented directly in electronic hardware.

The foregoing disclosure of the preferred embodiments of the present invention have been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of optimizing the antenna patterns on a first satellite and a second satellite that operate in conjunction to deliver content to a single radio receiver, the method comprising the steps of:

(a) selecting an objective predictive model for predicting link margin at a first location and a link margin at a second location;

(b) determining respective required transmit power-flux densities to achieve the first and second link margins;

(c) adjusting the power flux density for the first location by decreasing the power flux density for the first satellite and simultaneously increasing the power flux density for the second satellite, the step of adjusting comprising varying the respective antenna patterns of the first and second satellites;

(d) calculating a predicted joint availability for the first location; and (e) decreasing the power flux density for both the first and second satellites for the first location by adjusting the antenna patterns for the first and second satellites when it is determined that the required power flux density and joint availability for the second location cannot be attained.

2. The method of claim 1, wherein the objective predictive model is the extended empirical roadside shadowing model.

3. The method of claim 1, wherein the power flux density is determined based on a desired level of satellite availability.

4. The method of claim 1, further comprising iterating steps (c)–(e).

5. The method of claim 1, further comprising shaping or otherwise controlling an antenna pattern of the first satellite and the second satellite in view of a solution resulting from an iterative process comprising steps (c)–(e).

6. The method of claim 1, further comprising setting the joint availability at a value greater than 90%.

7. The method of claim 6, further comprising setting the joint availability at a value of about 99%.

8. A method of optimizing the antenna patterns on a first satellite and a second satellite, wherein each satellite is located in orbit to cover substantially the same geographic region and wherein the first and second satellites operate in conjunction to deliver content to a single radio receiver, the method comprising the steps of:

(a) determining respective required transmit power flux densities to achieve first and second link margins, wherein the power flux densities and the link margins are functions of desired satellite availability;

(b) adjusting the power flux density for a first location by decreasing the power flux density for the first satellite and simultaneously increasing the power flux density for the second satellite, the step of adjusting comprising varying the respective antenna patterns of the first and second satellites;

(c) calculating a predicted joint availability for the first location; and (d) decreasing the power flux density for both the first and second satellites for the first location by adjusting the antenna patterns for the first and second satellites when it is determined that the required power flux density and joint availability for a second location cannot be attained.

9. The method of claim 8, further comprising iterating steps (b)–(d).

10. The method of claim 8, further comprising shaping or otherwise controlling an antenna pattern of the first satellite and the second satellite in view of a solution resulting from an iterative process comprising steps (c)–(e).

11. The method of claim 8, further comprising setting the joint availability at a value greater than 90%.

12. The method of claim 6, further comprising setting the joint availability at a value of about 99%.

13. A system for optimizing the antenna patterns on a first satellite and a second satellite that operate in conjunction to deliver content to a single radio receiver, the system comprising:

(a) an objective predictive model for predicting link margin at a first location and link margin at a second location;

(b) means for determining respective required transmit power flux densities to achieve the first and second link margins;

(c) means for adjusting the power flux density for the first location by decreasing the power flux density for the first satellite and simultaneously increasing the power flux density for the second satellite, the means for adjusting comprising means for adjusting the respective antenna patterns of the first and second satellites;

(d) means for calculating a predicted joint availability for the first location; and (e) means for decreasing the power flux density for both the first and second satellites for the first location by adjusting the antenna patterns for the first and second satellites when it is determined that the required power flux density and joint availability for the second location cannot be attained.

14. The system of claim 13, wherein the objective predictive model is the extended empirical roadside shadowing model.

15. The system of claim 13, wherein the power flux density is determined based on a desired level of satellite availability.

16. The system of claim 13, wherein the joint availability is set at a value greater than 90%.

17. The system of claim 13, wherein the joint availability is set at a value of about 99%.

18. A system for optimizing the antenna patterns on a first satellite and a second satellite, wherein each satellite is located in orbit to cover substantially the same geographic region and wherein the first and second satellites operate in conjunction to deliver content to a single radio receiver, the system comprising:

(a) means for determining respective required transmit power flux densities to achieve the first and second link margins, wherein the power flux densities and link margins are functions of desired satellite availability;

(b) means for adjusting the power flux density for a first location by decreasing the power flux density for the first satellite and simultaneously increasing the power flux density for the second satellite, the means for adjusting comprising means for varying the respective antenna patterns of the first and second satellites;

(c) means for calculating a predicted joint availability for the first location; and (d) means for decreasing the power flux density for both the first and second satellites for the first location when it is determined that the required power flux density and joint availability for a second location cannot be attained.

19. The system of claim 18, wherein the joint availability is set at a value greater than 90%.

20. The system of claim 18, wherein the joint availability is set at a value of about 99%.

* * * * *